(12) United States Patent
Tilden et al.

(10) Patent No.: US 9,280,605 B2
(45) Date of Patent: Mar. 8, 2016

(54) SYSTEMS AND METHODS FOR ITINERARY MESSAGING SERVICE

(75) Inventors: Mark D. Tilden, Gig Harbor, WA (US); Jeff M. Kennedy, Lake Oswego, OR (US); Steve C. Wilson, Happy Valley, OR (US); Scott D. Hopkins, Scappoose, OR (US)

(73) Assignee: FLIGHTSTATS, INC., Portland, OR (US)

( * ) Notice: Subject to any disclaimer, the term of this patent is extended or adjusted under 35 U.S.C. 154(b) by 373 days.

(21) Appl. No.: 13/044,135

(22) Filed: Mar. 9, 2011

(65) Prior Publication Data

US 2011/0225257 A1 Sep. 15, 2011

Related U.S. Application Data

(60) Provisional application No. 61/313,016, filed on Mar. 11, 2010.

(51) Int. Cl.
*G06F 15/16* (2006.01)
*G06Q 50/00* (2012.01)
*G06F 17/30* (2006.01)
*G06Q 10/10* (2012.01)

(52) U.S. Cl.
CPC ........ *G06F 17/30867* (2013.01); *G06Q 10/107* (2013.01)

(58) Field of Classification Search
CPC ........... G06F 17/30867; G06Q 10/107; G06Q 10/02; G06Q 10/025
USPC .......................................... 709/207; 705/5, 6
See application file for complete search history.

(56) References Cited

U.S. PATENT DOCUMENTS

| | | | | |
|---|---|---|---|---|
| 6,023,679 A | * | 2/2000 | Acebo et al. | 705/5 |
| 7,263,664 B1 | * | 8/2007 | Daughtrey | 715/764 |
| 7,406,467 B1 | * | 7/2008 | White | 705/5 |
| 7,668,809 B1 | * | 2/2010 | Kelly | G06F 17/30528 705/5 |
| 8,615,418 B1 | * | 12/2013 | Niznik et al. | 705/7.22 |
| 8,731,990 B1 | * | 5/2014 | Osborne et al. | 705/7.22 |
| 2002/0066037 A1 | * | 5/2002 | Johnson | 713/201 |
| 2002/0111935 A1 | | 8/2002 | Jones et al. | |
| 2004/0039613 A1 | * | 2/2004 | Maycotte et al. | 705/5 |
| 2005/0086087 A1 | * | 4/2005 | Razza et al. | 705/5 |

(Continued)

OTHER PUBLICATIONS

FlightStats Messenger, [online], whole document, [retrieved on Sep. 4, 2013]. Retrieved from the Internet<URL:http://www.flightstats.com/go/About/FlightStatsMessengerBrief.pdf>.*

(Continued)

*Primary Examiner* — Philip Chea
*Assistant Examiner* — Wing Ma
(74) *Attorney, Agent, or Firm* — Stoel Rives LLP

(57) ABSTRACT

Messages are targeted to travelers based on travel itineraries. Targeting may also be based on real-time travel status information. The targeted messages communicate their purpose and priority to respective travelers within the context of the travel itineraries. A disclosed method includes accessing a travel itinerary database including a plurality of travel itineraries. Each travel itinerary is associated with a traveler and defines itinerary segments of a corresponding travel schedule. A message is associated with a set of targeting rules used to identify a subset of itineraries in the travel itinerary database. The targeting rules may be used with real-time travel status information to identify the subset of itineraries.

17 Claims, 13 Drawing Sheets

(56) References Cited

U.S. PATENT DOCUMENTS

| | | | |
|---|---|---|---|
| 2005/0096946 A1 | 5/2005 | Janakiraman et al. | |
| 2005/0216281 A1* | 9/2005 | Prior | 705/1 |
| 2005/0216301 A1 | 9/2005 | Brown | |
| 2005/0216318 A1 | 9/2005 | Gray | |
| 2006/0059024 A1* | 3/2006 | Bailey et al. | 705/5 |
| 2006/0064333 A1* | 3/2006 | Razza et al. | 705/5 |
| 2006/0265256 A1* | 11/2006 | Galperin et al. | 705/5 |
| 2007/0016439 A1* | 1/2007 | Stiles et al. | 705/1 |
| 2007/0043598 A1* | 2/2007 | Bertram et al. | 705/5 |
| 2007/0055555 A1* | 3/2007 | Baggett et al. | 705/5 |
| 2007/0100962 A1* | 5/2007 | Barth et al. | 709/217 |
| 2007/0164726 A1* | 7/2007 | de Marcken et al. | 324/127 |
| 2007/0299701 A1* | 12/2007 | Boyer et al. | 705/5 |
| 2008/0010104 A1* | 1/2008 | Williamson et al. | 705/5 |
| 2008/0041945 A1* | 2/2008 | Williamson et al. | 235/384 |
| 2008/0177584 A1* | 7/2008 | Altaf et al. | 705/5 |
| 2008/0270560 A1* | 10/2008 | Tysowski et al. | 709/207 |
| 2008/0319808 A1* | 12/2008 | Wofford | G06Q 10/02 705/6 |
| 2009/0177513 A1* | 7/2009 | Eckhart et al. | 705/8 |
| 2009/0210262 A1* | 8/2009 | Rines | G06Q 10/06 705/5 |
| 2009/0307321 A1* | 12/2009 | Sawant | 709/206 |
| 2010/0045485 A1* | 2/2010 | Dunsky | 340/945 |
| 2010/0190510 A1* | 7/2010 | Maranhas et al. | 455/456.1 |
| 2010/0191754 A1* | 7/2010 | Baker et al. | 707/758 |
| 2010/0228577 A1 | 9/2010 | Cunningham et al. | |
| 2010/0324958 A1* | 12/2010 | Stiles et al. | 705/7 |
| 2011/0022428 A1* | 1/2011 | Parker | 705/6 |
| 2012/0226647 A1* | 9/2012 | Murray et al. | 706/47 |
| 2012/0254419 A1* | 10/2012 | Gilzean et al. | 709/224 |

OTHER PUBLICATIONS

Tilden, Mark, Real-Time Flight Status Monitoring and Notification, [online], Jan. 2006, whole document, [retrieved on Sep. 4, 2013]. Retrieved from the Internet<URL:http://www.flightstats.com/go/About/FlightStatsMessengerWhitepaper.pdf>.*

McLaughlin, Meara et al., Intelligent Itinerary Monitoring, [online], Jun. 2007, whole document, [retrieved on Sep. 4, 2013]. Retrieved from the Internet<URL:http://www.flightstats.com/go/Travelport/Itinerary%20Monitoring%20White%20Paper-Update.pdf>.*

Notification of Transmittal of the International Search Report and the Written Opinion of the International Searching Authority, or the Declaration for application, application PCT/US2011/027698, international filed Mar. 9, 2011.

* cited by examiner

| Category | Message Types |
|---|---|
| 610 — Advisory | Natural Disaster Advisory<br>Travel Security Alert<br>Health Advisory |
| 612 — Airline / Flight | Special Flight Status Advisory<br>Air Traffic Control Advisory<br>Flight Incident<br>Airline Status Change<br>System Malfunction Advisory<br>Runway Construction<br>Policy Change<br>New Services<br>Special Events<br>Departure Advisory<br>Arrival Advisory<br>Cancellation Advisory<br>Missed Connection Advisory |
| 614 — Airport | Airport Security Advisory<br>Airport Emergency Advisory<br>Terminal Status Advisory<br>Terminal Construction<br>Inter Gate/ Terminal Transportation<br>Baggage Information Advisory<br>Suggestion / Tip<br>Gate Specific Instructions |
| 616 — Traffic & Parking | Parking Advisory<br>Road / Parking Construction Advisory<br>Road / Parking Construction Emergency<br>Car Pickup Advisory<br>Car Drop-off Advisory |
| 618 — Promotional Offer | Promotional Offer<br>Discount Coupon<br>Thank You Message |
| 620 — Ground Transportation | Ground Transportation Advisory |
| 622 — User Messages | Segment Change Request<br>Segment Options<br>Segment Traveler Choice<br>General Service Request<br>Traveler Status Update |
| 624 — Weather | Weather Advisory<br>Weather Warning<br>Current Weather Conditions |

FIG. 6

| Message Source | Priority | | |
|---|---|---|---|
| | Low | Moderate | High |
| Travel Agency | - Travel Info/ Suggestion<br>- Promotional Message | - Minor changes in reservation such as seat assignment or baggage claim assignment<br>- Severe weather warning or advisory | - Major changes in reservation<br>- Re-accommodation message after travel disruption<br>- Airport security updates the agency has received |
| Travel Supplier | - Upgrade offer<br>- Commercial offer (e.g., discount to use airline lounge) | - Information pertaining to a specific flight<br>- Information pertaining to airport (e.g., check-in, baggage restrictions security, etc.) | - Advance flight cancelations<br>- Major change in policy such as carry-on baggage restrictions |
| Security Company | - Country information | - General health & safety information | - Natural disaster<br>- Travel advisory/ warning<br>- Terrorist threat<br>- Health warning/ disease outbreak |
| Airport | - Travel info/ suggestion | - Airport facilities info such as parking info, construction or terminal transfer (train/bus) info | - Airport closure<br>- Airport security alert |
| Transportation Security Agency (TSA) | - General reminders of security procedures and requirements at a specific airport or all airports | - Specific security requirements or screening procedures at a specific airport | - Security breeches at an airport with instructions for travelers<br>- Specific security threats in an airport |
| Travel Manager / Travel Arranger | - Travel Info/ Suggestion | - Change in trip plans such as a meeting change | - Business meeting information |
| FlightStats | - Minor status change (e.g., baggage claim, or minor delay) | - Flight status change such as gate change<br>- Severe weather warning or advisory | - Flight cancellation<br>- Major flight status change (e.g., significant delay expected) |
| Vendor | - Promotional messages | | |
| Local Chamber of Commerce or business associations | - Travel suggestions<br>- Promotional messages | | |
| Friends / Family | - Personal messages | - Personal messages | - Personal messages |

FIG. 7

Itinerary Messages ?

Road Construction / Parking Advisory
Major Road Construction Continues Around DTW
Source: Wayne County Airport Authority

Security Advisory
Security Checkpoint Wait Time Exceeds 20 Minutes
Source: Port of Portland

Road Construction / Parking Advisory
Interstate 205 Glenn Jackson Bridge Construction
Source: FlightStats

Flight Advisory
Flight AS 120 Diverted to Oakland Airport
Source: Alaska Airlines View More Messages

FIG. 13

Flight Status for AS 562 [ Modify Search ▶ ]

AS 562 Flight Status

| | |
|---|---|
| Flight: (AS) Alaska Airlines 562 | Set Flight Alert |
| Departure Date: Thu 23-Sep-2010 | |
| Status: Flight is currently En route | Track Flight on Map |
| ● On-Time | |
| Last change to status 9 minutes ago | On the go? Checkout |
| Arrival Estimate: Estimated Gate Arrival at 12:30 | FlightStats Mobile! |

See below for departure and arrival deatails including Flight Notes

1510 → Itinerary Messages

| | |
|---|---|
| Airport | Road/Parking Construction Advisory |
| | Interstate 205 Glenn Jackson Bridge Construction |
| Advisory | Effective: Tue 21-Sep-2010 12:05 PST |
| | Expires: Tue 30-Sep-2010 12:00 PST       FLIGHT STATS |
| Weather | Source: FlightStats |
| | Possible weekend and Monday morning delays. An Interstate 205 Glenn Jackson Bridge project is underway to replace 20 deck joins on the north end of the bridge. Two-lane closure for construction on the bridge are planned from April 30 until September 2010 during weekend and early Monday mornings. Lane closures will occur in only one direction at a time. The specific schedule is dependent on good weather. |
| Promotion | For more details please click here |
| | Security Advisory |
| | Security Advisory for those traveling through PDX |
| | Effective: Tue 21-Sep-2010 12:05 PST |
| | Expires: Tue 30-Sep-2010 12:00 PST       PORT OF PORTLAND |
| | Source: Port of Portland |
| | Possible weekend and Monday morning delays. An Interstate 205 Glenn Jackson Bridge project is underway to replace 20 deck joins on the north end of the bridge. Two-lane closure for construction on the bridge are planned from April 30 until September 2010 during weekend and early Monday mornings. Lane closures will occur in only one direction at a time. The specific schedule is dependent on good weather. |
| | For more details please click here |
| | Chili's Now Open in American Airline's Concourse C |
| | Chili's Now Open in American Airline's Concourse C at DFW Airport |
| | DFW |
| | Effective: Tue 21-Sep-2010 12:05 PST |
| | Expires: Tue 30-Sep-2010 12:00 PST |
| | Source: DFW Airport |
| | Possible weekend and Monday morning delays. An Interstate 205 Glenn Jackson Bridge project is underway to replace 20 deck joins on the north end of the bridge. Two-lane closure for construction on the bridge are planned from April 30 until September 2010 during weekend and early Monday mornings. Lane closures will occur in only one direction at a time. The specific schedule is dependent on good weather. |
| | For more details please click here |

FIG. 15

SYSTEMS AND METHODS FOR ITINERARY MESSAGING SERVICE

RELATED APPLICATION

This application claims the benefit under 35 U.S.C. §119(e) of U.S. Provisional Application No. 61/313,016, filed Mar. 11, 2010, which is hereby incorporated by reference herein in its entirety.

TECHNICAL FIELD

This disclosure relates to computerized messaging systems. In particular, this disclosure is directed to systems and methods for targeting messages to travelers based on travel itineraries, and communicating the purpose and priority of the targeted messages within the context of the travel itineraries.

BACKGROUND INFORMATION

The dramatic growth in smart phones and internet-enabled mobile devices, combined with the increasingly broad availability of travel itineraries, is re-shaping the travel experience. A variety of companies, including airlines, travel agencies, and mobile application developers, have begun to recognize opportunities that exist for enabling travelers to carry and interact with their travel itinerary on a mobile device. There is a need, however, to do more than simply provide users with travel itineraries on their mobile devices.

Providers of travel-related services often desire to communicate with travelers. For example, a travel agency may want to notify its customers that a portion of a tour package is temporarily unavailable and offer alternatives, or an airline may want to notify passengers scheduled for a particular flight that the there is a mechanical problem with the aircraft, and the flight will be delayed and moved to another gate. However, it may be difficult or impossible for providers of travel-related services to match relevant messages with respective travelers in a timely fashion. In many instances, certain providers may not have any access to traveler contact information or even a way to identify travelers. For example, an airport may want to notify travelers that a certain airport parking garage is unavailable for a specific period of time, but the airport does not know the identities or contact information for travelers catching a flight at the particular airport during the specific period. Further, users of personal communication devices are often inundated with a large number of messages (e.g., emails and/or SMS text messages), which may result in travel-related messages being missed or ignored by users until the message is no longer relevant.

SUMMARY OF THE DISCLOSURE

The present disclosure provides systems and methods for targeting messages to travelers based on travel itineraries. Targeting may also be based on real-time travel status information. In addition, or in other embodiments, the targeted messages communicate their purpose and priority to respective travelers within the context of the travel itineraries.

In one embodiment, a method is provided for causing a computer system to target messages to travelers based on travel itineraries. The method includes accessing a travel itinerary database that includes a plurality of travel itineraries. Each travel itinerary is associated with one or more travelers and defines itinerary segments of a corresponding travel schedule. The method further includes receiving a request to provide a message, through an itinerary messaging system, based on an associated set of targeting rules. The received request includes the message, the associated targeting rules, and a message category. The method further includes identifying a subset of itineraries based on a comparison of the set of targeting rules with the plurality of itineraries in the travel itinerary database, associating the message with a priority level based on the message category, and communicating an indication of an availability of the message to the one or more travelers associated with each itinerary in the subset of itineraries. The indication of availability is based on at least one of the message category and the priority level. In some embodiments, identifying the subset of itineraries is further based on a comparison of the targeting rules with real-time travel status information associated with one or more of the itinerary segments.

Additional aspects and advantages will be apparent from the following detailed description of preferred embodiments, which proceeds with reference to the accompanying drawings.

BRIEF DESCRIPTION OF THE DRAWINGS

FIG. 6 is a table illustrating example message types and associated categories according to one embodiment.

FIG. 7 is a table illustrating relationships between message sources, message priorities, and message types according to one embodiment.

FIG. 13 graphically illustrates a user interface for an itinerary display including a list view of messages for display on a web page according to one embodiment.

FIG. 15 graphically illustrates a user interface for an itinerary display including a tabbed interface for displaying itinerary messages associated with a specific flight according to another embodiment.

DETAILED DESCRIPTION OF PREFERRED EMBODIMENTS

I. Overview

Figure 1:
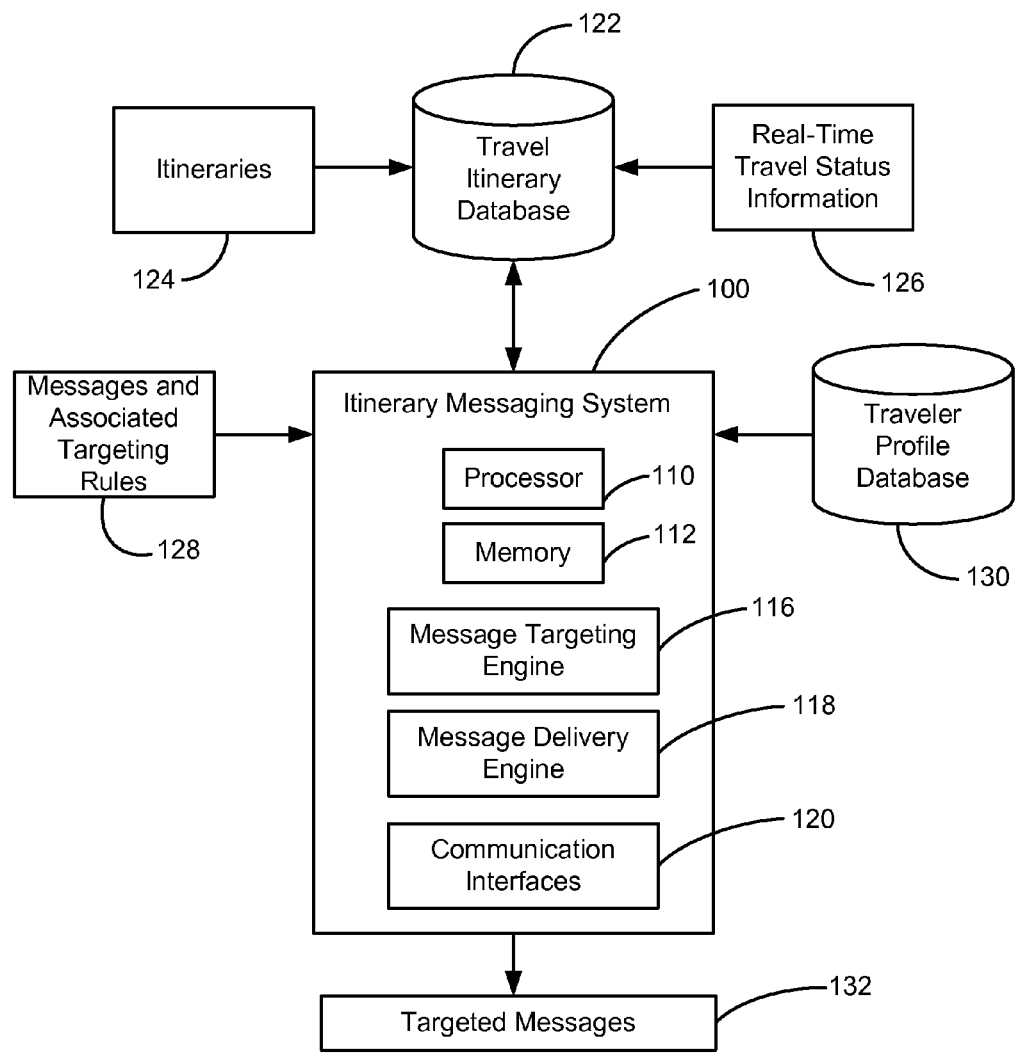
FIG. 1 is a block diagram of an itinerary messaging system according to one embodiment.

An itinerary messaging system, according to certain embodiments disclosed herein, is configured to target messages based on both scheduled itinerary segments and real-time travel status information. This capability allows users of the system to specify targeting rules for identifying travelers who receive messages, which dramatically improves the messages' relevance and value when compared to more general "broadcast" messaging solutions or even newer "location-based" services that do not have specific information about each respective traveler's current situation and needs.

The itinerary messaging system may classify the messages according to a priority level and a message category. The itinerary messaging system may further select which travelers receive the messages based on the classification so as to provide specific travelers with relevant and timely information. In certain embodiments, the itinerary messaging system controls the types of messages (e.g., the priority level and message category) that can be received from a particular message source or publisher. For example, an airport food vendor may be allowed to send low priority promotional messages to travelers stranded in an airport, while an airport authority may be allowed to send high priority airport closure or security alerts to targeted travelers.

In one embodiment, the itinerary messaging system further targets messages based on user generated events that provide information associated with a traveler's current situation. For example, the traveler may indicate that he or she has cleared customs at an airport, checked into a hotel, or arrived at a particular venue or geographic location. Such user generated events, when combined with travel itinerary information, provide message targeting beyond that which is possible through either location-based or itinerary-based messaging systems. Highly targeted marketing is possible from knowing a traveler's itinerary, and even their precise current location, as is readily possible with modern GPS (global positioning system) enabled mobile phones. Message targeting becomes even more compelling when the traveler's itinerary is combined with accurate, timely real-time flight status information that informs the current situation of their itinerary.

With real-time flight status, the system knows, for example, when a traveler is stuck in a hub airport for several hours because his or her outbound connecting flight is delayed. The system knows when a traveler is likely to miss a connecting flight because the first segment of his or her connecting flight is delayed. This is very powerful information both for providing useful assistance to the traveler as well as for delivering a variety of valuable, timely, and highly targeted messages to the travelers.

In one embodiment, the itinerary messaging system also provides icon alert messaging, which includes messages displayed in the context of an itinerary display that allows travelers to receive message alerts without obtrusive email or SMS (short message service) text messaging. The icons quickly identify the nature and priority of the message that is waiting for the traveler. The icons may represent message categories to communicate, in a passive way, the existence of a message in the category (e.g., using active vs. inactive icon states), the number of messages that exist in each category, and/or the priority of messages (e.g., the icons may indicate the existence of at least one message of a high priority for the corresponding category).

In one embodiment, the itinerary messaging system allows a traveler to control which messages he or she receives and how the messages should be delivered. For example, travelers can choose to receive email or SMS text messages for certain types of messages, priorities of messages, and/or sources of messages. Travelers can also choose to show icons on an itinerary display for certain priorities and message sources, and suppress icons for lower priorities or from specific sources. In such embodiments, the system allows travelers to see all applicable messages if they so choose, but they will not have to sort through a plethora of messages in an email or text message inbox to locate the relevant messages.

In one embodiment, the itinerary messaging system provides a two-way structured conversation, which includes both a defined structure and a work flow, between a traveler and a provider of travel-related services. For example, the itinerary messaging system may provide a two-way structured conversation between a travel agent and a traveler that allows the traveler to request a change to an itinerary by selecting a travel segment and answering a few questions about the nature of the change (e.g., one hour earlier, three hours later, etc.). The message structure in such embodiments ensures that all of the relevant details required to process the change request are provided by the traveler. When the travel agent responds to the change request, the message includes a structured set of choices from which the traveler can choose. The message structure includes the list of choices. The message work flow encapsulates a process (e.g., the traveler requests a change, the agent responds with change options and corresponding prices, the traveler chooses a change option, the agent makes the change, and the traveler receives a confirmation message and an updated itinerary).

The embodiments of the disclosure will be best understood by reference to the drawings, wherein like elements are designated by like numerals throughout. In the following description, numerous specific details are provided for a thorough understanding of the embodiments described herein. However, those of skill in the art will recognize that one or more of the specific details may be omitted, or other methods, components, or materials may be used. In some cases, operations are not shown or described in detail. For illustrative purposes, some drawings include text that is small, including some text that may not be legible due to the height of the text. The small text is provided as graphical elements of the drawing for illustrative purposes only, and not for the content of the text.

II. Example Itinerary Messaging System

FIG. 1 is a block diagram of an itinerary messaging system 100 according to one embodiment. In this example embodiment, the itinerary messaging system 100 includes a processor 110, a computer-readable memory device 112, a message targeting engine 116, a message delivery engine 118, and one or more communication interfaces 120. The processor 110 is configured to execute instructions stored in the computer-readable memory device 112 to perform the processes described herein. In certain embodiments, each of the illustrated engines 116, 118, 120 includes machine-executable instructions stored within the computer-readable memory and executable by the processor 110.

The itinerary messaging system 100 is configured to access a travel itinerary database 122 that includes a plurality of travel itineraries. The travel itineraries within the travel itinerary database 122 define itinerary segments (see FIG. 2) of a corresponding travel schedule. The travel itinerary database 122 may receive new itineraries 124 from, for example, travelers, travel agencies, travel suppliers, and other providers of travel-related services. The travel suppliers providing itineraries 124 to the travel itinerary database 122 may include, for example, airlines, cruise lines, ground transportation companies, or hotels. Such travel suppliers may provide direct bookings for travelers. FIG. 1 shows an arrow directly from the new itineraries 124 to the travel itinerary database 122 to indicate that travelers, travel agencies, travel suppliers, and other providers of travel-related services may directly add the itineraries 124 to the travel itinerary database 122. In other embodiments, the itinerary messaging system 100 directly receives one or more of the new itineraries 124 and adds them to the travel itinerary database 122.

The travelers, travel suppliers, and other providers of travel-related services may update one or more of the travel itineraries in the travel itinerary database 122 with real-time travel status information 126. The real-time travel status information 126 may include, for example, flight status information (e.g., flight delays or cancellations), airport status information, traffic or ground transportation status information, updated weather information, updated security information, and/or user-generated event information (e.g., GPS location, hotel check-in, clear customs, etc.). FIG. 1 shows an arrow directly from the real-time status information 126 to the travel itinerary database 122 to indicate that the travelers, travel agencies, travel suppliers, and other providers of travel-related services may directly update the itineraries in the travel itinerary database 122 (or replace existing itineraries with updated or new itineraries 124). In other embodiments, the itinerary messaging system 100 directly receives at least some of the real-time status information 126 and updates the corresponding itineraries in the travel itinerary database 122. In one embodiment, the itinerary messaging system 100 receives a stream of real-time status information from, e.g., airlines and/or the federal aviation administration, which the itinerary messaging system 100 associates with specific itineraries in the travel itinerary database 122.

As shown in FIG. 1, the itinerary messaging system 100 receives messages and associated targeting rules 128 from sources or publishers such as travel agencies, airlines, cruise lines, ground transportation companies, hotels, airport authorities (e.g., a government or commercial entity charged with the management and operation of an airport), airport concession operators, government agencies (e.g., travel security administration), private security companies, corporate travel managers, business associations, chambers of commerce, travelers, and/or designated friends or family members of the corresponding travelers.

In one embodiment, the itinerary messaging system 100 receives traveler profiles from a traveler profile database 130. The traveler profiles may include, for example, traveler identification information, traveler contact information, and message delivery preferences. The message delivery preferences indicate which types of messages the particular travelers want to receive and how different types of messages should be delivered. As mentioned above, travelers can choose to receive email or SMS text messages for certain types of messages, priorities of messages, and/or sources of messages based on the message delivery preferences in the corresponding traveler profiles. Travelers can also choose to show icons on an itinerary display for certain priorities and message sources, and suppress icons for lower priorities or from specific sources based on the message delivery preferences in the corresponding traveler profiles.

For a particular message and associated set of targeting rules 128 received by the itinerary messaging system 100, the message targeting engine 116 identifies a subset of itineraries by comparing the set of targeting rules with the plurality of itineraries in the travel itinerary database 122. In other words, the message targeting engine 116 searches for and identifies itineraries that satisfy the set of targeting rules. The message delivery engine 118 selects an icon associated with a message category indicated by the message. In certain embodiments, the message delivery engine 118 also performs filtering of the messages based, for example, on the message delivery preferences discussed above. The one or more communication interfaces 120 communicates the message (shown as targeted messages 132) to the selected one or more travelers.

Figure 2:
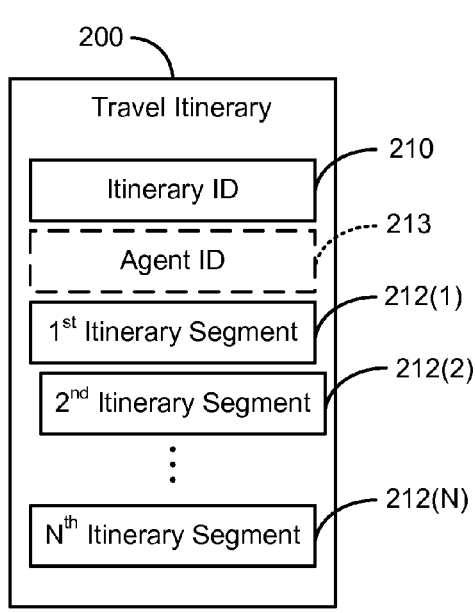
FIG. 2 is a block diagram illustrating a data structure for a travel itinerary according to one embodiment.

FIG. 2 is a block diagram illustrating a data structure for a travel itinerary 200 according to one embodiment. The travel itinerary 200 may be stored, for example, in the travel itinerary database 122 shown in FIG. 1. In this example embodiment, the travel itinerary 200 includes an itinerary identifier (ID) 210 and a plurality of itinerary segments 212. The itinerary ID 210 uniquely identifies the travel itinerary 200 within the travel itinerary database 122. In certain embodiments, the itinerary ID 210 also identifies a traveler and/or traveler contact information associated with the particular travel itinerary 200.

In other embodiments, the identity of the associated traveler and/or travel contact information is not provided by the travel itinerary 200 or made known to the itinerary messaging system 100. For example, the itinerary 200 may have been added to the travel itinerary database 122 by a travel agent (or other provider of travel-related services) that does not desire to disclose the associated traveler's identity to the itinerary messaging system 100. In some embodiments, the itinerary ID 210 includes only a record locator (e.g., a confirmation number) and possibly a last name of the traveler. Because the itinerary messaging system 100 cannot be sure that the person viewing the itinerary is the actual traveler, the itinerary messaging system 100 does not allow display of some classes of messages in this context.

As shown in FIG. 2, the travel itinerary 200 in certain embodiments may include an optional agent ID 213 that uniquely identifies the travel agent (or agency) that provided the travel itinerary 200 to the travel itinerary database 122. The communication interface 120 in such an embodiment provides any targeted messages 132 for the particular travel itinerary 200 to the travel agent associated with the agent ID 213. The travel agent associated with the agent ID 213 may then, at his or her discretion, provide the targeted messages 132 to the traveler. For example, some travel agencies provide "empty" itineraries 124 (i.e., itineraries with no passengers) to the travel itinerary database for the itinerary messaging system 100 to monitor based on selected monitoring rules. When a monitoring rule is triggered, the itinerary messaging system 100 sends an XML message back to the agency, who handles all message delivery to the traveler.

For illustrative purposes, FIG. 2 shows only three of the N number of itinerary segments as 1st itinerary segment 212(1), 2nd itinerary segment 212(2), . . . , Nth itinerary segment 212(N). Persons having skill in the art will recognize, however, that the travel itinerary 200 may have any number of itinerary segments 212, including less than three segments (or even a single segment). Each itinerary segment 212 corresponds to a different part of a travel schedule such as a particular flight in a series of connecting flights, a layover at an airport between flights, a rental car reservation or other ground transportation arrangement, a hotel reservation, and/or a scheduled meeting. Each itinerary segment 212 includes segment parameters that define the respective part of the travel schedule.

Figure 3:
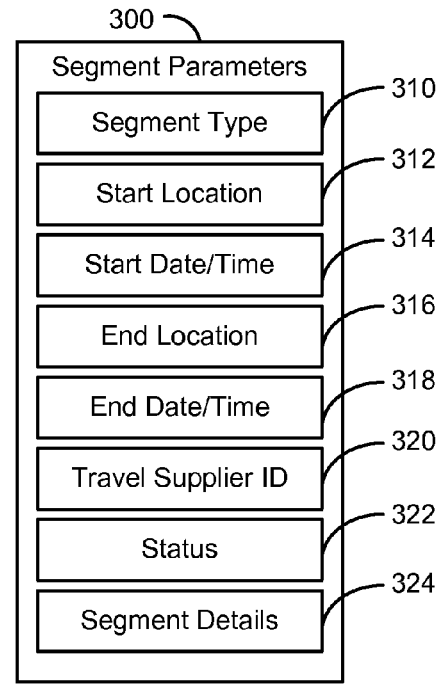
FIG. 3 is a block diagram of a data structure for segment parameters of an itinerary segment shown in FIG. 2 according to one embodiment.

For example, FIG. 3 is a block diagram of a data structure for segment parameters 300 of an itinerary segment 212 shown in FIG. 2 according to one embodiment. In the illustrated example embodiment, the segment parameters 300 include a segment type 310 (e.g., air, automobile, rail), start location 312 for the segment, start date and/or time 314 for the segment, end location 316 for the segment, end date and/or time 318 for the segment, travel supplier ID 320 for the segment (e.g., a particular airline carrier ID and/or flight number), status 322 of the segment (e.g., delayed, canceled, in progress, complete), and/or segment details 324. The segment details 324 may include, for example, in-flight meal information, assigned seat information, driving directions information, business meeting information, expense reporting information, billing information, or other information useful to the traveler to complete the corresponding itinerary segment 212. Skilled persons will recognize from the disclosure herein that not every segment parameter shown in FIG. 3 is used in every embodiment, and that different types of itinerary segments 212 may include additional or different segment parameters.

Figure 4A:
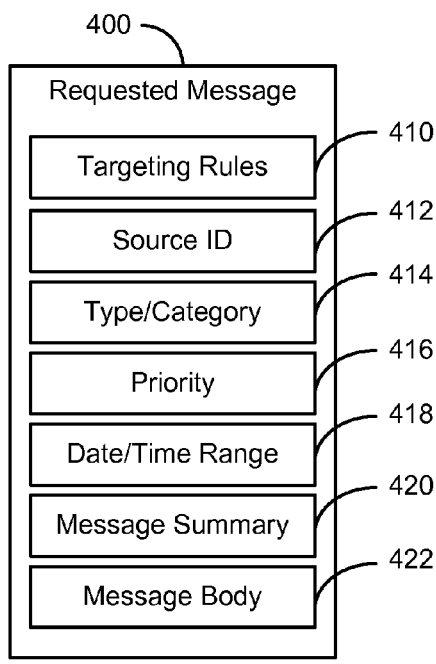
FIG. 4A is a block diagram of a data structure for a requested message according to one embodiment.

FIG. 4A is a block diagram of a data structure for a requested message 400 according to one embodiment. As discussed above, the requested message 400 may be communicated to the itinerary messaging system 100 by sources or publishers such as travel agencies, airlines, cruise lines, ground transportation companies, hotels, airport authorities, airport concession operators, government agencies, private security companies, corporate travel managers, business associations, chambers of commerce, travelers, and/or designated friends or family members of the corresponding travelers. In the example illustrated embodiment, the requested message 400 includes a set of targeting rules 410 used to identify a subset of itineraries in the itinerary database 122, a source ID 412 to uniquely identify the source or publisher of the message (and which may include a graphical logo for branding of the message), a type and/or category 414 of the message (discussed below), a priority level 416 of the message (discussed below), a date and/or time range 418 during which the message is valid, a message summary 420 (e.g., a headline or title of the message set by the source or publisher and limited to a predetermined number of characters), and a message body 422 (which may include information and/or instructions in the form of plain text or HTML including links and graphics).

Figure 4B:
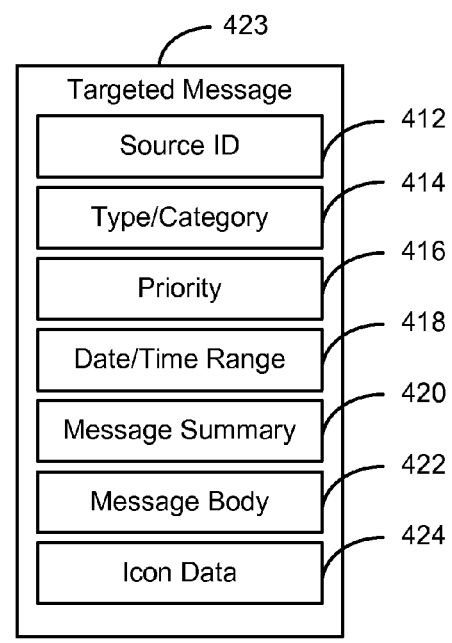
FIG. 4B is a block diagram of a data structure for a targeted message according to one embodiment.

FIG. 4B is a block diagram of a data structure for a targeted message 423 according to one embodiment. For example, the illustrated targeted message 423 may be one of the targeted messages 132 provided to a traveler by the itinerary messaging system 100 shown in FIG. 1. The targeted message 423 includes the source ID 412, type and/or category 414, priority level 416, date and/or time range 418, message summary 420, and message body 422 of the corresponding requested message 400 (shown in FIG. 4A). However, in this example, the targeted message 423 does not include the targeting rules 410, which are used by the itinerary messaging system 100 but not by individual travelers. The targeted message 423 may also include icon data 424 that includes a command to display a particular icon associated with the message or graphical data necessary for generating a display of the particular icon.

With reference to FIGS. 1, 2, 3, 4A, and 4B, the itinerary messaging system 100 according to certain embodiments provides a "hub" through which many of the world's air-travel and other travel itineraries 124 may flow. As discussed above, there is a need to do more than simply collect and distribute itineraries. While there is substantial value in simply collecting itineraries from a broad variety of sources and making them available to mobile applications, web sites, and other customers, the embodiments disclosed herein add value by providing ways to leverage the intelligence gained from knowing a traveler's itinerary.

By accessing a traveler's itinerary 124, combined with real-time travel status information 126 (e.g., flight status information) and (in some embodiments) GPS location information, the itinerary messaging system 100 is able to target messages 132 to the traveler at a high level of specificity and relevance. Regardless of the message delivery mechanism (e.g., email, SMS text, or other communication channels), the ability to target messaging based on knowledge of the traveler's itinerary and status dramatically increases the value of the messages delivered.

Further, the itinerary messaging system 100 according to certain embodiments includes a message delivery mechanism that provides message "alert" icons that are combined with an itinerary display on a web site or mobile device. The message alert icons are displayed in the context of the user's itinerary and alert the user to available messages that are highly relevant to their specific itinerary and situation. Users can view the messages by clicking on or touching the icon in their itinerary display.

The itinerary messaging system 100 is a highly targeted communication channel that connects travel suppliers and other stake-holders in the travel experience (e.g., airports, security companies, ground transportation companies, etc.) with travelers based on knowledge of the traveler's itinerary 124 and the traveler's real-time travel status 126.

The itinerary messaging system's targeted messages 132 may be delivered by various methods. For example, the targeted messages 132 may be indicated on an itinerary display on a mobile device or web site by one or more icons displayed in the context of the itinerary. In certain embodiments, the messages 132 may be transmitted (e.g., from a wireless access point) to a remote location, such as a hotel lobby or an airport, for display on a kiosk or other display device. Various icons may be used to show the source of the message and the type of message. In certain embodiments, each icon indicates a source and/or message type and the severity or priority of its corresponding message. The user may be able to view the messages by clicking on or touching the icons. As another example of a message delivery method, messages may also be delivered via email. Certain high priority messages from travel suppliers may be delivered without a user's explicit choice to opt-in. Other lower priority types of messages may require a user's choice to receive low priority messages via email. In certain embodiments, messages may also be delivered as data via XML over HTTP or SOAP. In addition, or in other embodiments, messages may be delivered via SMS text messaging (though in some embodiments, this may be limited to messages delivered via email-to-SMS gateways).

In some embodiments, travel suppliers and other stake-holders are offered access to the itinerary messaging system 100 via a subscription. The subscription model may be based, for example, on a per-message delivered fee or simply a flat access fee. Subscribers may specify the targets of the messages based on a robust set of itinerary and status rules. Access to the itinerary messaging system 100 may be offered to a variety of industry players on a subscription basis with pricing based on message volumes. Messaging subscribers (i.e., message sources) may include travel agencies, travel suppliers, security companies, airports, airport concessions and businesses, and corporate travel arrangers or travel managers.

The following are but a few examples of the types of targeting rules that a message subscriber may specify for a particular message. An airline may target a message to all travelers departing on a particular flight explaining the cause of a flight delay and suggesting that travelers not come to the gate area until a later time. As another example, a car rental company may target a promotional message to any traveler who is arriving at a particular airport that is not his or her home or origin airport. Such targeted travelers may be more likely to be renting a car than other travelers because they are not arriving at their home airport and they are not simply making a connection on another flight. As another example, a travel agency or security company may target a message to all travelers whose itineraries include a stay or connection within a certain date range in a particular city where a security threat exists. As another example, an airport concession company may target a message to all travelers who are connecting through a specific airport with a connection time (either scheduled or caused by flight delays) of, e.g., 90 minutes or more. Such travelers often have "time to kill" (e.g., idle time or time without any scheduled activities) and represent a substantial marketing opportunity for airport restaurants or other concessions. As yet another example, an airport authority may target all passengers departing a specific airport during a certain day or over a date range informing them about a parking lot change or a parking lot being full and recommending alternatives.

Generally, travelers book their reservations through a variety of channels including, for example, traditional "brick and mortar" travel agencies, on-line travel agencies (OTAs), and supplier direct bookings. Traditional travel agencies are most often used for corporate travel because many larger corporations use the services of an agent to negotiate better fares with the travel suppliers (e.g., airlines, hotels, car rental companies) and to enforce corporate travel policy. OTAs are companies that often have no traditional retail offices, but do all of their selling on-line. Most of an OTA's business is with "unmanaged" travelers (e.g., leisure travel or small companies that do not have corporate travel departments). Typically, airlines, hotels, and car rental companies do a substantial part of their business through direct bookings on their web sites or through their call centers.

Each of these booking channels generally has its own database of booked itineraries. Larger agencies or suppliers may book millions of itineraries every month and their customers are increasingly demanding access to these itineraries through the internet and/or through mobile devices. However, travel agencies and travel suppliers are often somewhat reluctant to share the itineraries broadly because they are aware of the value of the market intelligence they represent, even though most of them have few, if any effective ways to monetize that intelligence.

The itinerary messaging system 100 creates a way for agencies and airlines to distribute their itineraries so as to meet traveler demand to display their itineraries on mobile devices. In certain embodiments, the itinerary messaging system 100 allows agencies and travel suppliers to attach their brand to their corresponding itineraries wherever they are displayed. In addition, or in other embodiments, the itinerary messaging system 100 combines the itineraries with real-time flight status information that allows the agencies and travel suppliers proactively serve their customers when travel interruptions occur due to delays or cancellations. Generally, the agencies and suppliers recognize that their itineraries have value, for example, in targeted marketing. The itinerary messaging system 100 provides a way to effectively monetize that value and share the revenue with the agencies and suppliers, who are generally hungry for additional revenue sources.

The itinerary messaging system 100 meets the goals of the travel suppliers and agencies by substantially expanding the collection of the itineraries 124 in the travel itinerary database 122 and providing mobile-optimized web viewers for the companies that provide itineraries 124 as well as an API (Application Programming Interface) that allows mobile application developers and other companies to retrieve and display the itineraries from the travel itinerary database 122 with appropriate permission from the agencies and travel suppliers that provide them.

By collecting and distributing a substantial volume of itineraries, the itinerary messaging system 100 monetizes the value of the itineraries 124 in ways that create revenue streams that may be shared with the agencies and travel suppliers that provide their itineraries 124 to the travel itinerary database 122. Travel suppliers and agencies may have strong motivation to offer their itineraries 124 to the travel itinerary database 122 because their itineraries 124 can become a new revenue stream (instead of a cost) and the itinerary messaging system 100 may distribute those itineraries to many other companies, including mobile application developers and security companies, among others. In addition, the real-time travel status information 126 allows the itinerary messaging system 100 to combine the itineraries with timely actionable information that further enhances the value of the itineraries.

Figure 5:
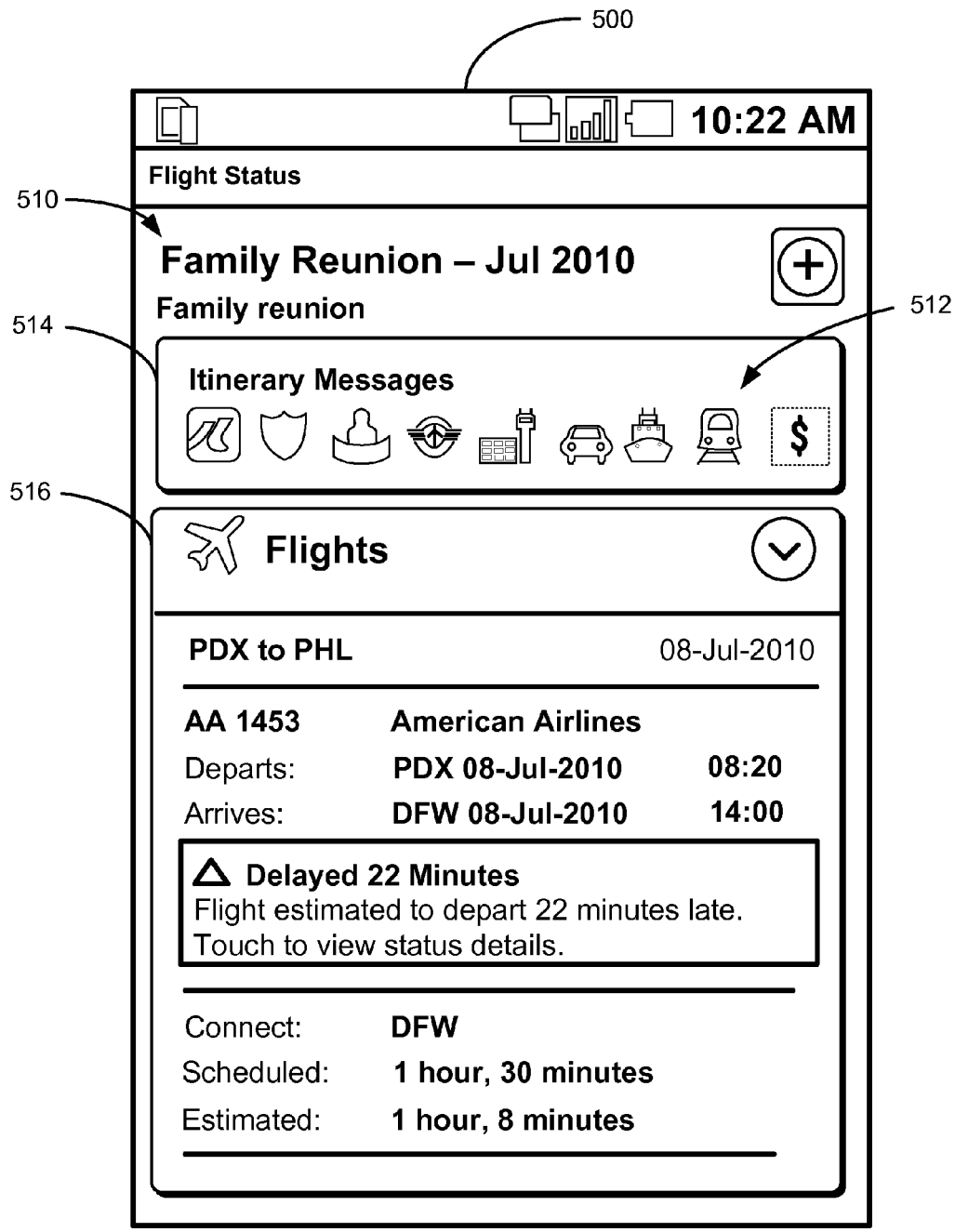
FIG. 5 graphically illustrates a user interface for a mobile device including an itinerary display according to one embodiment.

The itinerary messaging system 100 allows a variety of travel stake-holders to send highly targeted, relevant messages 132 to customers based on very specific targeting criteria specified by the sender. The message delivery engine 118 and the one or more communication interfaces 120 allow the itinerary messaging system 100 to deliver the targeted messages 132 to travelers in a variety of contexts and environments. In one embodiment, the message delivery engine 118 selects an icon that the one or more communication interfaces 120 displays along with an itinerary that the itinerary messaging system 100 retrieves from the travel itinerary database 122. The itineraries may be displayed on a mobile device or web site. For example, FIG. 5 graphically illustrates a user interface 500 for a mobile device including an itinerary display 510 according to one embodiment. The itinerary display 510 in the illustrated example includes a variety of icons 512 shown across the top of the itinerary display 510 in an itinerary messages window 514. The icons 512 may be displayed along the top, as illustrated, or next to specific itinerary segments (e.g., the displayed flights segment 516), depending on the itinerary display format and message type. While the itinerary display 510 shows nine icons 512, this disclosure is not so limited and fewer or more icons may be displayed. For example, certain embodiments only show one or two icons at a time, since in many cases, there may be a limited number of messages for a specific traveler. The user can display the content of a message by clicking or touching one of the displayed icons 512. The precise format of the itinerary display may be up to an application developer. Various other example displays are described below.

Returning to FIG. 1, the one or more communication interfaces 120 may also deliver the targeted messages 132 via email to users whose itineraries in the travel itinerary database 122 match the message targeting rules 128, and where the particular message is either of a high priority or the user has specifically chosen to accept messages of the specific type and/or priority level being delivered. In addition, or in other embodiments, the one or more communication interfaces 120 may deliver the targeted messages 132 via SMS text messaging. Some embodiments use an infrastructure that only supports SMS delivery via email-to-SMS gateways. However, other embodiments may either use direct SMS delivery mechanisms or partner with SMS delivery providers to deliver messages via this format. In certain embodiments, even where the traveler (or travel agency) has setup a profile option to have messages of certain classes and/or priority levels forwarded through email and/or SMS text messaging, those messages still appear as highlighted icons in an itinerary display (in addition to being delivered via email and/or SMS text messaging).

In addition, or in other embodiments, the one or more communication interfaces 120 deliver the targeted messages 132 and/or icons to mobile devices using push technologies (e.g., Apple® Push Notification Service). The one or more communication interfaces 120 may use other message delivery platforms including, but not limited to, interactive TV, hotel kiosks, and automotive GPS systems. In each of these cases, the messages may be displayed in a format similar to the mobile or web-based itinerary displays, using the icons to notify the user of applicable messages. The one or more communication interfaces 120 may also use RSS (really simple syndication) to deliver the targeted messages 132 in certain embodiments. The one or more communication interfaces 120 may also deliver the targeted messages 132 to a user's social network (e.g., Facebook®, MySpace®, etc.) according to certain embodiments.

Some targeted messages 132 may apply to a particular flight segment or airport regardless of other itinerary elements and may be published even with simple segment-based flight status queries or queries for airport information. For example, the itinerary messaging system 100 may include a notification icon with flight status results indicating that additional details or messages are available. Airlines may send explanatory messages along with an updated estimated departure time for a flight, for example. Airports may also send messages that apply to all passengers as well as non-travelers (e.g., friends, family, drivers, etc.) who will be visiting the airport during a specified time interval.

As discussed above, the itinerary messaging system 100 may allow travelers to create "user-generated" events that can provide additional detail on the status of their trip that is not available through publicly available flight status information. For example, users may be able to easily click a button or icon on their itinerary display to indicate that they have checked into their hotel, that they have cleared customs, or even just to report their current position (e.g., as a Latitude and Longitude). Some mobile client applications may even be configured to automatically generate position report updates on a regular basis. The user generated events may also provide additional criteria for message targeting. As travelers get used to initiating user-generated events, the itinerary messaging system 100 may use those user-generated events in the message targeting rules. For example, a security company may want to provide customs instructions to any traveler who is arriving at a certain airport or country but has not yet cleared customs.

III. Example Scenarios

A few simple example scenarios illustrate how the itinerary messaging system 100 may be used.

A. Scenario #1: Airport Advisories

In this example scenario, DFW airport (Dallas/Fort Worth International Airport) has construction going on at one of its terminals that is causing major traffic backups at the departures and curb-side check-in area. Using the itinerary messaging system 100, the DFW airport authority can send a message to every traveler whose itinerary indicates that they are departing from DFW within a certain range of dates and times, and advising them to use a special shuttle service available from the short-term parking lot. All travelers whose itineraries indicate that they are departing from DFW during the affected period see an alert icon displayed next to their itinerary. A traveler may also elect to receive email notification if he or she chooses to receive the messages that way, but the itinerary messaging system 100 notification may simply appear as an icon next to their itinerary (or next to a DFW departure segment) indicating that a message that is significant to this itinerary is available for viewing. Travelers who are connecting through DFW do not receive the message because they are not affected by the traffic delays.

Notice that DFW does not need to know the email addresses or any contact information for any of these travelers. They simply submit the message via a secure itinerary messaging system web site, along with a priority and message type, and specify the conditions for delivery (e.g., they may specify targeting rules that the message be delivered to all travelers departing from DFW between specified dates and times). Also, travelers or other interested parties (such as a spouse or driver) will see this same message if they query for flights that arrive or depart through DFW during the specified time interval, or if they view airport information pages for DFW during the specified time interval.

B. Scenario #2: Traveler Security Alerts

In another example scenario, if a corporate travel manager or a company's security company becomes aware of a potential security threat, such as criminal activity, terrorist threat, health advisory or natural disaster in a particular city or area, the travel manager or security company can use the itinerary messaging system 100 to send an advisory to all their travelers who currently are, or will be arriving in that city within the next 24 hours. The security company or travel manager simply sends the message to all travelers within their "account" (i.e., the travelers they manage) whose itineraries indicate that they either are in, or will be in the affected area within the next 24 hours. Because this is a high priority message, the icon displayed next to the itinerary may be flashing to indicate a high-priority message is available. The security company or travel manager may also have the option of sending an email in addition to the targeted message displayed in the itinerary context. Both are handled by the itinerary messaging system 100, based on the knowledge of the traveler's itineraries and having their contact information within the itinerary database.

C. Scenario #3: Special Offers within a Connecting Airport

In another example scenario, an airport restaurant at ORD airport (Chicago O'Hare International Airport) may wish to attract customers by offering a special discount to travelers who are connecting through ORD with connection times longer than 90 minutes. These travelers will often be looking for a way to "kill time" in the airport and are very likely to respond to such targeted specials. Some travelers have itineraries with long connect times planned into their original itineraries. Other travelers may have extended connect times due to delays in outbound flights or due to missed connections. Because the itinerary messaging system 100 has both the traveler's itinerary plan and real-time flight status information, the itinerary messaging system 100 is able to identify travelers who will be at ORD waiting more than 90 minutes for a connection, even if their original itinerary did not include a long connection time. These travelers may see a special offer icon next to their displayed itinerary. They can click the icon to view the special offer, which may include an electronic coupon for discounts good only for today or another specified amount of time.

D. Scenario #4: Airline Alert Message

As another example scenario, airlines often do not have the contact information for all the passengers on their flights. When passengers book through a travel agency, the agency may choose not to share the full contact information with the airline, in order to protect their relationship with the customer. When a problem develops on a flight, the airline's only option is usually to publish the new estimated departure time through normal flight status channels. That information may eventually be relayed to the customers who have access to flight status information, but the airline cannot include any comments or suggestions to the passengers. Travelers report the frustration experienced with incrementally increasing delays where little information is shared beyond people standing directly around the boarding gate area.

The itinerary messaging system 100 provides a new communication channel the airlines can use to better serve their customers when unusual situations develop, even the passengers for which the airline does not have any contact information. Using the itinerary messaging system 100, the airline can send a message to passengers that are departing on a particular flight segment on a specified date. While the airline does not have the contact information for some passengers booked through agencies, the itinerary messaging system 100 is more likely to have that contact information because agencies can share it without compromising their proprietary customer data. Everyone wins in this scenario. The travel agency's customer is better served, the airline is better able to communicate with passengers, and the passengers have more useful information to help them make decisions about their travel experience.

The examples herein illustrate that the itinerary messaging system 100 offers unique value in messaging delivery that is not available through other channels. For example, the targeted messages 132 can be extremely specifically targeted where only travelers who fit the criteria specified receive the message. Further, the targeted messages 132 are displayed directly in the context of the itinerary where they make the most sense. Thus, high priority travel messages do not get lost in a high volume of other email. Also, the itinerary messaging system 100 may be a complement to email and SMS text messaging. The itinerary messaging system 100 may have email addresses or mobile phone numbers for most travelers or for their travel arrangers, so messages can be delivered in any combination as icons on the itinerary, via SMS text messaging, and/or via email, depending on traveler preference and message priority. Travelers can also be assured that the targeted messages 132 are of high value because messages can be very specifically targeted and subscribers may pay for message delivery based on volume, so there may be an incentive to use the channel appropriately. Travelers may also have the option to hide message icons of specific types or importance levels, increasing the value of the messages.

IV. Example Message Sources and Message Types

The itinerary messaging system 100 may receive the messages and associated targeting rules 128 from many different types of message sources. Such message sources include, for example, travel agencies, travel suppliers (e.g., airline, hotel, car rental companies, cruise lines, etc.), security companies, airports, government security agencies such as the Transportation Security Agency (TSA), travel managers and/or travel arrangers, advertisers (e.g., airport concession businesses, other businesses associated with the travel industry, and/or other business not associated with the travel industry), local chambers of commerce or business associations, Flight-Stats.com (a website providing real-time and historical flight status information), and/or friends and family of travelers.

The itinerary messaging system 100 may deliver many different types of messages, which may be classified into different categories. Each of the message categories may be represented by a unique icon on the itinerary display. FIG. 6 is a table illustrating example message types and associated categories according to one embodiment. A travel warning or advisory category 610 may be associated with information about a security threat in a particular hotel or region of a city. An airline or flight status category 612 may be associated with delayed, canceled, or missed flights. An airport category 614 may be associated with delays at an airport where the traveler is departing, arriving or connecting. A traffic and/or parking category 616 may be associated with traffic and parking advisories. A promotional offer category 618 may be associated with, for example, an electronic discount coupon for all travelers connecting through a particular airport with a minimum amount of time available before their departure. A ground transportation category 620 may be associated with ground transportation advisories. A user messages category 622 may be associated with, for example, traveler messages regarding particular itinerary segments or personal greetings or informational messages to an individual traveler or small group of travelers from a travel agent, or friends and family. A weather category 624 may be associated with, for example, a warning about an expected ice storm that may affect travelers in a particular city or area. Although not illustrated, persons having skill in the art will recognize other categories such as a travel information or suggestions category associated with, for example, a message from a cruise line giving arriving passengers information about where to meet their ground transportation to the ship. As yet another example, an emergency messages category may be associated with, for example, a message informing a traveler of an immediate need to return to the office as the result of an emergency situation.

FIG. 7 is a table illustrating relationships between message sources, message priorities, and message types according to one embodiment. In this example embodiment, each message source may only send predetermined types of messages, each of which is pre-assigned to a low, moderate, or high priority based on an urgency of the message. In other words, in this example embodiment, the message sources are not allowed to send messages outside of their predetermined set of message types or to change the priority level of a particular message type. For example, a local chamber of commerce is allowed to send low priority travel suggestions, but is not allowed to send an airport closure or security alert. Further, the local chamber of commerce is not allowed to change the priority level of the travel suggestions from a low priority to a moderate or high priority.

V. Example Method for Targeting Messages to Travelers

Figure 8:
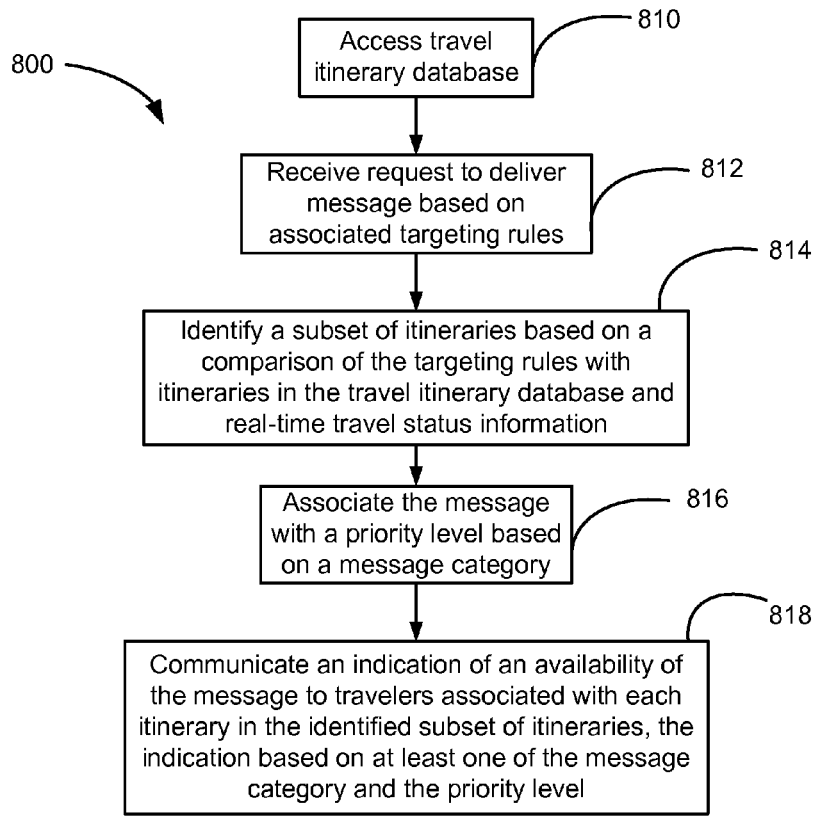
FIG. 8 is a flow diagram of a method for targeting messages to travelers based on travel itineraries according to one embodiment.

FIG. 8 is a flow diagram of a method 800 for targeting messages to travelers based on travel itineraries according to one embodiment. The method 800 includes accessing 810 a travel itinerary database that includes a plurality of travel itineraries. Each travel itinerary is associated with one or more travelers and defines itinerary segments of a corresponding travel schedule. The method 800 further includes receiving 812 a request to deliver a message, through an itinerary messaging system, based on an associated set of targeting rules. The received request includes the message, the associated targeting rules, and a message category. The method 800 further includes identifying 814 a subset of itineraries based on a comparison of the targeting rules with the plurality of itineraries in the travel itinerary database. In some embodiments, the targeting rules are also compared with real-time travel status information to identify the subset of itineraries. The method 800 further includes associating 816 the message with a priority level based on the message category, and communicating 818 an indication of an availability of the message to the one or more travelers associated with each itinerary in the subset of itineraries. The indication of availability is based on at least one of the message category and the priority level.

In some embodiments, as mentioned above, identifying the subset of itineraries is further based on a comparison of the subset of targeting rules with real-time travel status information associated with one or more of the itinerary segments. A targeting rule might require, for example, matching all itineraries with a connection time longer than 90 minutes. In such an example, itineraries with scheduled connections of longer than 90 minutes may or may not match depending on the status of the incoming and outbound flights. Itineraries with connections that were scheduled to only be 60 minutes, but experience a delay in the outbound flight that makes the connection longer than 90 minutes would then match the targeting rule based on the real-time travel status information.

Each of a plurality of predetermined message categories may be associated with a different icon. In such embodiments, communicating the indication of the availability of the message includes displaying, in the context of the respective itinerary, an icon associated with the message category of the received request.

In one embodiment, communicating the indication of the availability of the message further includes transmitting a command for displaying the icon associated with the message category of the received request to a mobile user device. The transmitted command may instruct the mobile user device to display the icon along with the associated itinerary. In another embodiment, communicating the indication of the availability of the message includes displaying the along with the associated itinerary on a web page accessible by the corresponding traveler. In another embodiment, communicating the indication of the availability of the message includes transmitting data for displaying the icon to a remote kiosk.

In certain embodiments, the icon may be modified to indicate a number of messages within the category available to the corresponding traveler. In addition, or in other embodiments, the icon may be modified to indicate the priority level of the message.

In one embodiment, communicating the message includes transmitting the message and an itinerary identification number to a travel agency associated with the corresponding traveler.

In one embodiment, communicating the indication of the availability of the message to the one or more travelers includes transmitting the message and an itinerary identification number to a travel agency associated with the corresponding traveler.

One embodiment further includes communicating the message in response to a request for flight status information.

In one embodiment, classifying the message includes defining a plurality of message types, and assigning each of the plurality of message types to a respective category. Each category includes at least one message type, and at least one category includes a plurality of message types. Classifying the message further includes assigning a priority to each message type, and determining the message type of the requested message.

In addition, or in another embodiment, classifying the message may further include identifying a message source corresponding to the requested message, wherein the message source is associated with a predetermined subset of the plurality of message types. The identified message source may be selected from the group comprising a travel agency, an airline, a cruise line, a ground transportation company, a hotel, an airport authority, an airport concession operator, a government agency, a private security company, a travel manager, a business association, a chamber of commerce, a traveler, and a designated friend or family member of the corresponding traveler.

In one embodiment, the method further includes receiving message delivery preferences from travelers. The message delivery preferences define rules for blocking display of an icon associated with the message category in the context of the associated itinerary. The message delivery preferences may further define rules for directly delivering notifications to the respective travelers of the message, the notifications being pushed from the itinerary messaging system to user devices associated with the respective travelers. Pushing the notifications may include communicating the notifications using at least one of email, text messaging, and a push notification service. Further, the notifications may be communicated from the itinerary messaging system to a third-party device for display outside the context of the associated itineraries. The third-party display device may be located, for example, in at least one of a hotel lobby and an airport.

In one embodiment, identifying the subset of itineraries further includes identifying, through the comparison, segment parameters within the subset of itineraries specified by the targeting rules, the segment parameters including one or more parameters selected from the group comprising arrival airport, departing airport, operating airline, airport terminal, flight connection information, flight status information, and geographic region of travel.

In one embodiment, the method further includes providing two-way structured communication between a travel agent and a traveler through the itinerary messaging system, the two-way structured communication allowing the traveler to request a change to an itinerary.

VI. Example Itinerary Displays

As discussed above, the itinerary display 510 shown in FIG. 5 includes a plurality of icons 512 associated with respective message categories. The icons 512 provide for "compressing" information regarding a potentially large number of messages into a small screen area.

Figure 9:
FIG. 9 graphically illustrates a plurality of example icons according to one embodiment.

FIG. 9 graphically illustrates a plurality of example icons 900 according to one embodiment. The icons 900 are respectively associated with an advisory message category, an airline message category, an airport message category, a traffic and parking message category, a promotion offer message category, a ground transportation message category, a user messages category, and a weather category. Persons skilled in the art will recognize from the disclosure herein that other icons and/or categories may also be used. In addition to indicating different message categories, each icon may be modified to indicate a level of priority for an available message. For example, each icon may be a first color when only low priority messages are available, a second color when medium priority message is available, and a third color when at least one high level message is available.

A. Context View

In one embodiment, itinerary messages are displayed in a "contextual view" such that users interact with the messages in the context of a flight, itinerary, flight listing, or airport information screen. The context determines which messages are displayed based on the specific targeting rules associated with individual messages. An itinerary display having a contextual view may allow multiple messages to span multiple categories by compressing information into limited space while providing visual cues to the user as to message content.

In one embodiment, a fixed or static icon bar displays an entire set of icons. Icons for categories with no available messages are displayed in a dimmed or disabled state. The itinerary messages window 514, according to certain embodiments, is a fixed icon bar. When a user touches one of the icons 512 or the entire itinerary messages window 514, the itinerary display 510 either expands to display all messages or switches to a new screen that displays messages in a list view pattern.

Figure 10A:
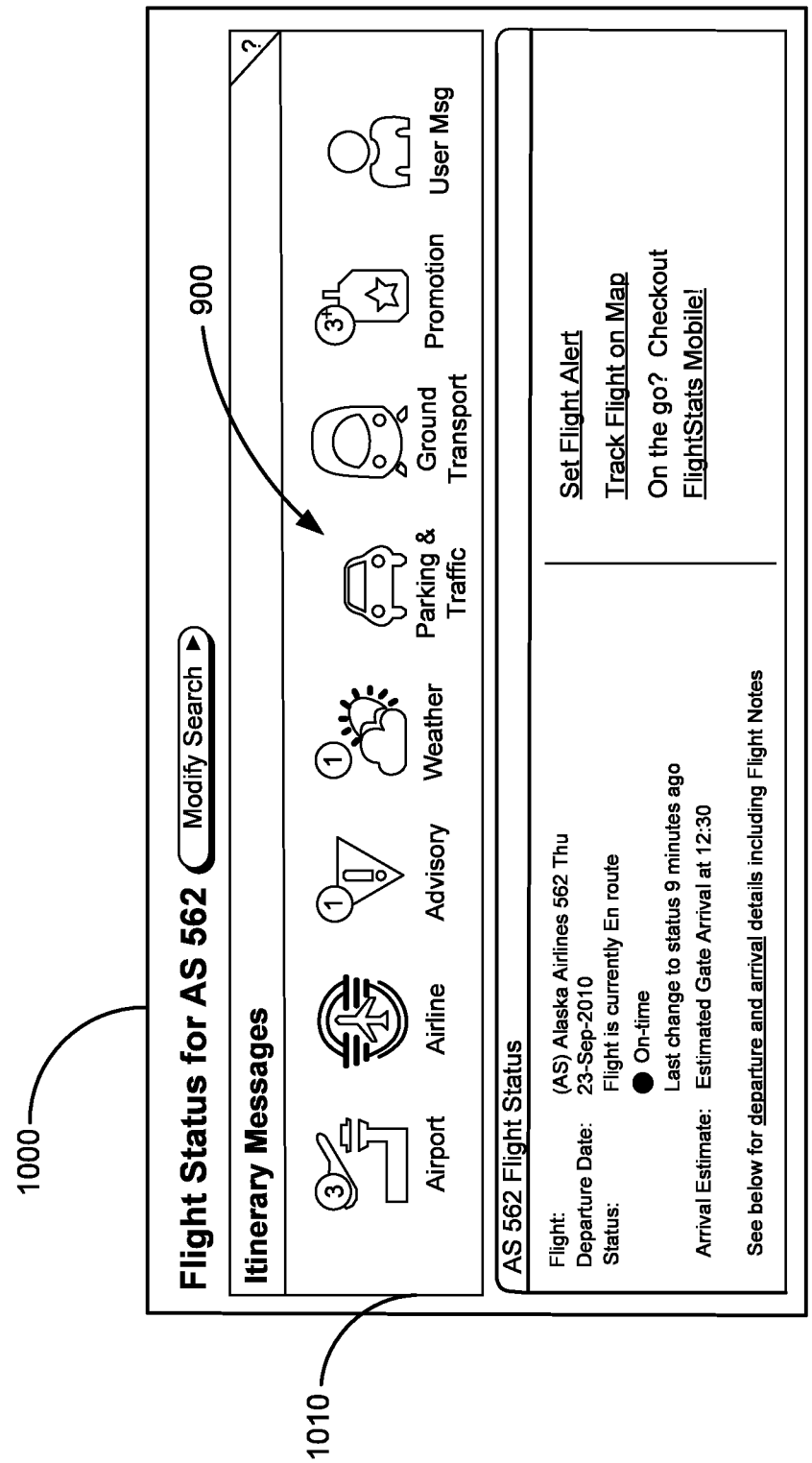
FIG. 10A graphically illustrates a user interface for an itinerary display including a fixed icon bar according to one embodiment.
Figure 10B:
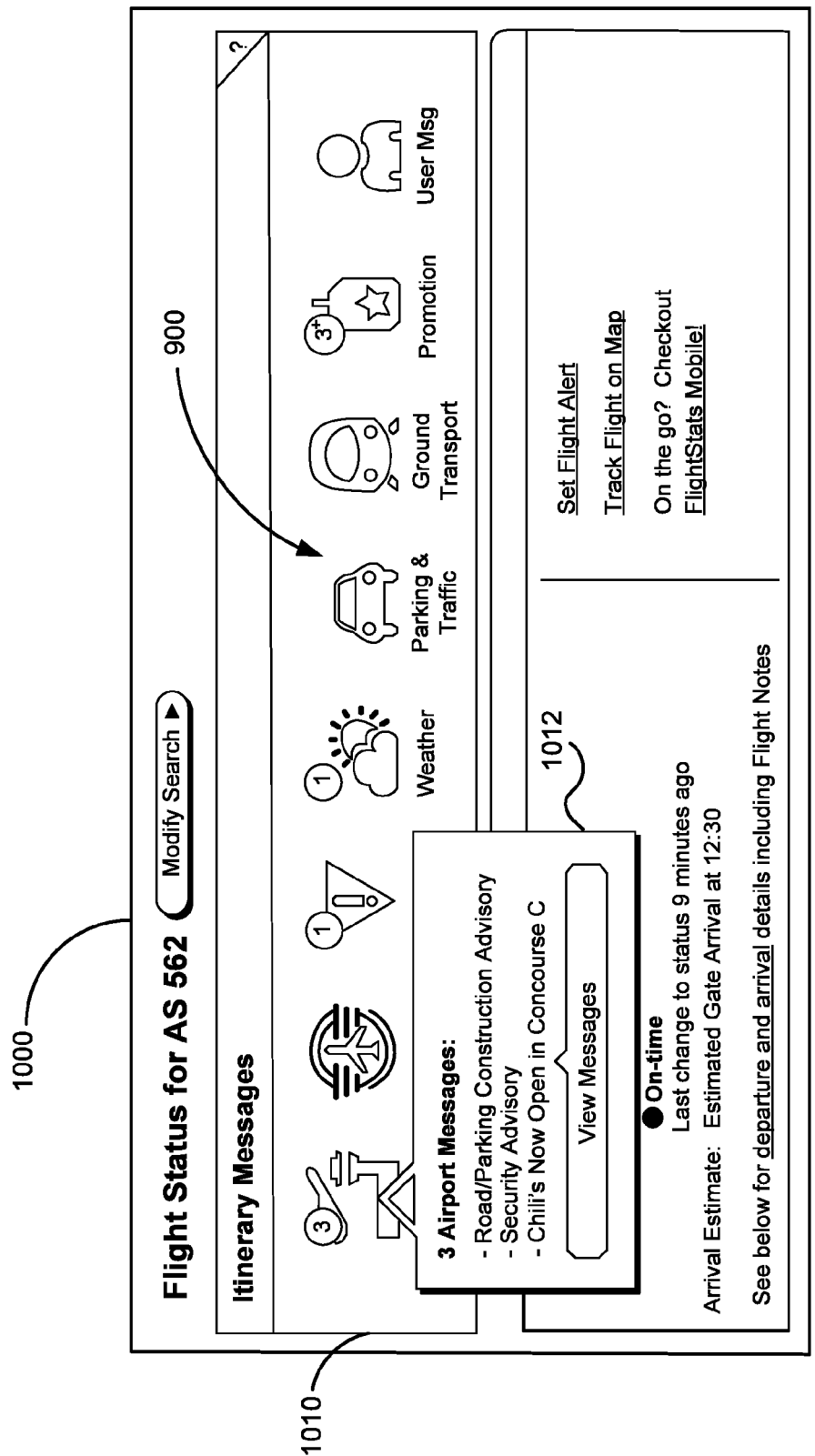
FIG. 10B graphically illustrates the user interface shown in FIG. 10A with a pop-up window displayed relative to one of the icons in the fixed icon bar according to one embodiment.

FIG. 10A graphically illustrates a user interface 1000 for an itinerary display including a fixed icon bar 1010 according to one embodiment. The example shown in FIG. 10A corresponds to providing the itinerary display in the context of a website that provides flight status information (e.g., such as FlightStats.com). The fixed icon bar 1010 includes the plurality of icons 900 shown in FIG. 9. Some of the icons 900 have been modified in FIG. 10A, however, to indicate the number of messages available for the corresponding category (by the circled numbers shown next to or over the icons). From the state of the icons 900 shown in FIG. 10A, the user can immediately see there are three (3) airport related messages, one (1) advisory message, one (1) weather related message, and more than three (3+) promotional offers that are relevant for the displayed flight segment (flight AS 562). FIG. 10B graphically illustrates the user interface 1000 shown in FIG. 10A with a pop-up window 1012 displayed relative to one of the icons 900 in the fixed icon bar 1010 according to one embodiment. The pop-up window may show additional detail when the user positions a cursor (not shown) over one of the icons 900.

In another embodiment, a dynamic icon list displays only icons for which there are active messages. In certain such embodiments, this results in fewer icons. For mobile applications, the number of icons displayed may be limited to a small number to thereby reduce screen space requirements and/or icon clutter. When there are messages spanning a number of categories that exceeds the maximum number allowed by the design, a "more messages" button or link may be used. In this case, display preference may be given to those categories that include high priority messages over categories that do not have any high-priority messages. By way of example, FIG. 11 graphically illustrates a user interface 1100 for an itinerary display including a dynamic icon bar 1110 in the context of a flight status website according to one embodiment.

Figures 11, 12:
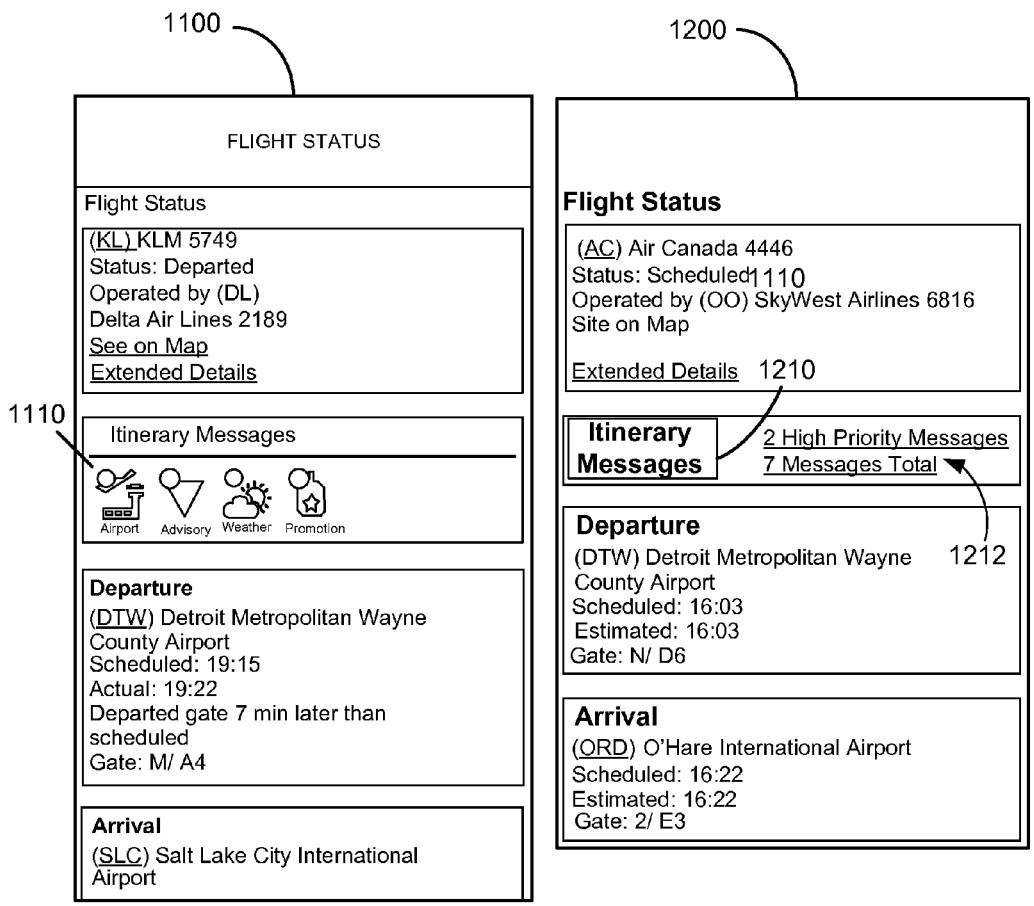
FIG. 11 graphically illustrates a user interface for an itinerary display including a dynamic icon bar in the context of a flight status website according to one embodiment.
FIG. 12 graphically illustrates a user interface for an itinerary display including a button and contextual information to convey information to a user regarding messages that apply to a particular flight according to one embodiment.

In another embodiment, a badge or button is displayed to signal to a user that messages are waiting. When the user selects the button, either a popup or navigation to another screen reveals a static icon bar or dynamic icon list as described above. Adding the number of messages and highest level of importance alongside the button enhances the user experience. This may be a useful approach when screen real estate is limited. FIG. 12 graphically illustrates a user interface 1200 for an itinerary display including a button 1210 and contextual information 1212 to convey information to a user regarding messages that apply to a particular flight according to one embodiment.

B. List View

In one embodiment, itinerary messages are displayed in a list view wherein multiple messages are displayed that apply to a given context such as a flight or itinerary. For example, FIG. 13 graphically illustrates a user interface 1300 for an itinerary display including a list view of messages for display on a web page according to one embodiment.

Figure 14:
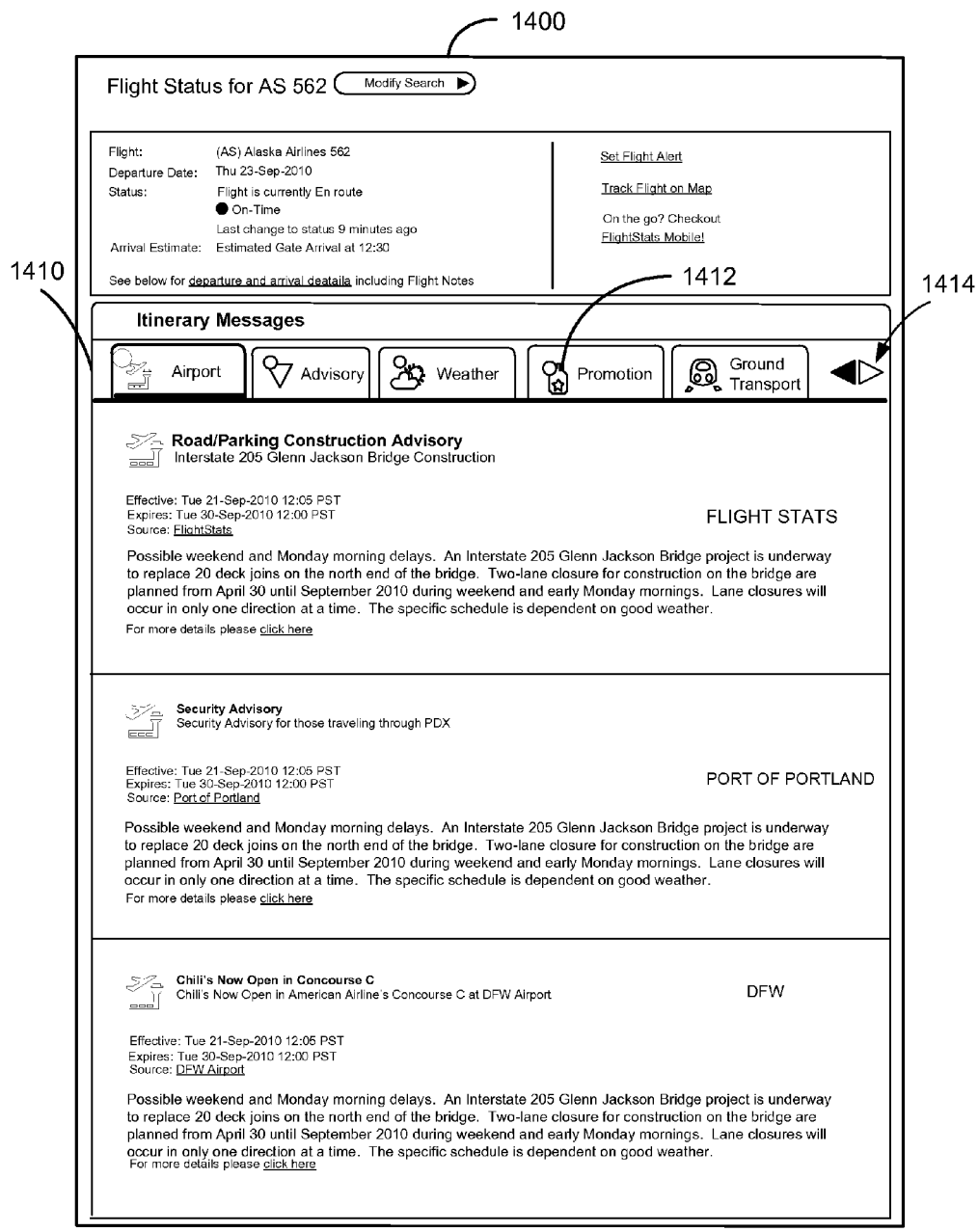
FIG. 14 graphically illustrates a user interface for an itinerary display including a tabbed interface for displaying itinerary messages associated with a specific flight according to one embodiment.

FIG. 14 graphically illustrates a user interface 1400 for an itinerary display including a tabbed interface 1410 for displaying itinerary messages associated with a specific flight according to one embodiment. In other words, a tab control is used to filter the messages by message category. Next/Previous buttons 1414 to the right of the tabs are used as a scroll that displays additional tabs for other message categories. Icons 1412 are displayed in the tabs to reinforce the connection between what is represented in the icon bar and the list view by category. In this example, the user navigates to this screen by selecting one of the category icons in either of the icon bar examples or by clicking on the badge or button discussed above. If the user selects a specific icon in an icon bar, that corresponding tab is selected and the messages in the category displayed. For illustrative purposes, FIG. 14 includes some text that is small, including some text that may not be legible due to the height of the text. The small text is provided as graphical elements of the drawing for illustrative purposes only so as to show the relative locations of text within the user interface 1400, and not for the content of the text.

FIG. 15 graphically illustrates a user interface 1500 for an itinerary display including a tabbed interface 1510 for displaying itinerary messages associated with a specific flight according to another embodiment. This is an alternative to the tabbed approach shown in FIG. 14 in that the category icons are displayed vertically. In this example, an approach similar to the icon bar may be used in which all icons are shown but those that do not have messages are in a disabled state. For illustrative purposes, FIG. 15 includes some text that is small, including some text that may not be legible due to the height of the text. The small text is provided as graphical elements of the drawing for illustrative purposes only so as to show the relative locations of text within the user interface 1500, and not for the content of the text.

C. Detail View

Figure 16:
FIG. 16 graphically illustrates a user interface including a detail view of a message according to one embodiment.

FIG. 16 graphically illustrates a user interface 1600 including a detail view of a message according to one embodiment. The detail view includes a message source, which identifies the source or publisher of the message and ads credibility as to the content of the message. Although not shown in FIG. 16, the message source may include a logo. Displaying a logo helps brand the message for the publisher. The detail view may also include a message category that is stated explicitly in conjunction with the icon or implicitly by using the icon by itself. The detail view may also include the priority of the message as high, medium, or low to help users understand how that information is communicated in the icons themselves. The detail view may also include a summary including, for example, the message title and brief information that may also be presented to the user in the contextual view or list view. The detail view may also include a message body or description that provides detailed information of the message. The detail may be text or HTML and may include graphics or links. Due to the variable length of the message body, support for scrolling may also be included in the detail view. In certain embodiments, the detail view also includes a date and/or time range for which a message is valid.

The above-described features, operations, or characteristics may be combined in any suitable manner in one or more embodiments. It will also be readily understood that the order of the steps or actions of the methods described in connection with the embodiments disclosed may be changed as would be apparent to those skilled in the art. Thus, any order in the drawings or Detailed Description is for illustrative purposes only and is not meant to imply a required order, unless specified to require an order.

Embodiments may include various steps, which may be embodied in machine-executable instructions to be executed by a general-purpose or special-purpose computer (or other electronic device). Alternatively, the steps may be performed by hardware components that include specific logic for performing the steps or by a combination of hardware, software, and/or firmware.

Embodiments may also be provided as a computer program product including a machine-readable medium having stored thereon instructions that may be used to program a computer (or other electronic device) to perform processes described herein. Example non-transitory machine-readable mediums include, but are not limited to, hard drives, floppy diskettes, optical disks, CD-ROMs, DVD-ROMs, ROMs, RAMs, EPROMs, EEPROMs, magnetic or optical cards, solid-state memory devices, or other types of media/machine-readable medium suitable for storing electronic instructions.

Several aspects of the embodiments described may be illustrated as software modules, components, or engines. As used herein, a software module, component, or engine may include any type of computer instruction or computer executable code located within a memory device. A software engine may, for instance, comprise one or more physical or logical blocks of computer instructions, which may be organized as a routine, program, object, component, data structure, etc., that performs one or more tasks or implements particular abstract data types.

In certain embodiments, a particular software engine may comprise disparate instructions stored in different locations of a memory device, which together implement the described functionality of the engine. Indeed, a component or engine may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software components may be located in local and/or remote memory storage devices. In addition, data being tied or rendered together in a database record may be resident in the same memory device, or across several memory devices, and may be linked together in fields of a record in a database across a network.

It will be understood by those having skill in the art that many changes may be made to the details of the above-described embodiments without departing from the underlying principles of the invention. The scope of the present invention should, therefore, be determined only by the following claims.

The invention claimed is:

1. A method for causing a computer system to target messages to travelers or other users who request display of travel itineraries or flight status, the method comprising:
accessing a travel itinerary database comprising a plurality of travel itineraries, each travel itinerary associated with one or more travelers and defining a plurality of itinerary segments, and corresponding connections between the plurality of itinerary segments, of a corresponding travel schedule;
receiving a request to associate a message, to be delivered through an itinerary messaging system, to a dynamically changing subset of itineraries of the plurality of travel itineraries based on an associated set of targeting rules, wherein the received request includes the message, the associated targeting rules, and a message category, and wherein the request, when received, is not associated with the plurality of travel itineraries or the one or more travelers;
identifying, continuously during a time interval specified in the set of targeting rules, the dynamically changing subset of itineraries based on a comparison of the set of targeting rules with both of:
the plurality of itineraries in the travel itinerary database; and
changes in real-time travel status information of the plurality of itinerary segments and the corresponding connections;
associating the message with a priority level based on the message category; and
associating the message, during the time interval, with the dynamically changing subset of itineraries, wherein a display of a selected itinerary in the dynamically changing subset provides an indication of availability of the message, and wherein the indication of availability is based on at least one of the message category and the priority level.

2. The method of claim 1, wherein each of a plurality of predetermined message categories is associated with a different icon, and wherein the indication of the availability of the message comprises displaying, in the context of the respective itinerary, an icon associated with the message category of the received request.

3. The method of claim 2, wherein the indication of the availability of the message comprises displaying the icon associated with the message category of the received request along with the respective itinerary on a web page accessible by the corresponding traveler.

4. The method of claim 2, wherein the indication of the availability of the message comprises transmitting data for displaying the icon associated with the message category of the received request to a remote kiosk.

5. The method of claim 2, further comprising modifying the icon associated with the message category of the received request to indicate a number of messages within the message category that are available to the corresponding traveler.

6. The method of claim 2, further comprising modifying the icon associated with the message category of the received request to indicate the priority level.

7. The method of claim 1, wherein the indication of the availability of the message comprises transmitting the message and an itinerary identification number to a travel agency associated with the corresponding traveler.

8. The method of claim 1, further comprising communicating the message in response to a request for flight status information.

9. The method of claim 1, further comprising classifying the message by:
defining a plurality of message types;
assigning each of the plurality of message types to a respective category, wherein each category includes at least one message type, and wherein at least one category includes a plurality of message types;

assigning a priority to each message type; and
determining the message type of the requested message.

10. The method of claim 9, further comprising identifying a message source corresponding to the requested message, wherein the message source is associated with a predetermined subset of the plurality of message types.

11. The method of claim 10, wherein the identified message source is selected from the group comprising a travel agency, an airline, a cruise line, a ground transportation company, a hotel, an airport authority, an airport concession operator, a government agency, a private security company, a travel manager, a business association, a chamber of commerce, a destination marketing organization, a traveler, and a designated friend or family member of the corresponding traveler.

12. The method of claim 1, wherein identifying the subset of itineraries further comprises identifying, through the comparison, segment parameters within the subset of itineraries specified by the targeting rules, the segment parameters comprising one or more parameters selected from the group comprising arrival airport, departing airport, operating airline, airport terminal, flight connection information, flight status information, and geographic region of travel.

13. The method of claim 1, further comprising providing two-way structured communication between a travel agent and a traveler through the itinerary messaging system, the two-way structured communication allowing the traveler to request a change to an itinerary.

14. An itinerary messaging system comprising:
a processor;
a computer-readable memory comprising program comprising instructions for causing the processor to:
  access a travel itinerary database comprising a plurality of travel itineraries, each travel itinerary associated with one or more travelers and defining a plurality of itinerary segments, and corresponding connections between the plurality of itinerary segments, of a corresponding travel schedule; and
  receive a request to associate a message, to be delivered through the itinerary messaging system, to a dynamically changing subset of itineraries of the plurality of travel itineraries based on an associated set of targeting rules, wherein the received request includes the message, the associated targeting rules, and a message category, and wherein the request, when received, is not associated with the plurality of travel itineraries or the one or more travelers;
a message targeting engine for identifying, continuously during a time interval specified in the set of targeting rules, the dynamically changing subset of itineraries based on a comparison of the set of targeting rules with both of:
  the plurality of itineraries in the travel itinerary database; and
  changes in real-time travel status information of the plurality of itinerary segments and the corresponding connections;
a message delivery engine for:
  associating the message with a priority level based on the message category; and
  associating the message, during the time interval, with the dynamically changing subset of itineraries, wherein a display of a selected itinerary in the dynamically changing subset provides an indication of availability of the message, and wherein the indication of availability is based on at least one of the message category and the priority level.

15. The system of claim 14, wherein each of a plurality of predetermined message categories is associated with a different icon, and wherein the message delivery engine is further configured to display an icon associated with the message category of the received request in the context of the respective itinerary.

16. A computer-readable memory comprising program code for performing a method used in an itinerary messaging system to target messages to travelers based on travel itineraries, the method comprising:
accessing a travel itinerary database comprising a plurality of travel itineraries, each travel itinerary associated with one or more travelers and defining a plurality of itinerary segments, and corresponding connections between the plurality of itinerary segments, of a corresponding travel schedule;
receiving a request to associate a message, to be delivered through an itinerary messaging system, to a dynamically changing subset of itineraries of the plurality of travel itineraries based on an associated set of targeting rules, wherein the received request includes the message, the associated targeting rules, and a message category, and wherein the request, when received, is not associated with the plurality of travel itineraries or the one or more travelers;
identifying, continuously during a time interval specified in the set of targeting rules, the dynamically changing subset of itineraries based on a comparison of the set of targeting rules with both of:
  the plurality of itineraries in the travel itinerary database; and
  changes in real-time travel status information of the plurality of itinerary segments and the corresponding connections;
associating the message with a priority level based on the message category; and
associating the message, during the time interval, with the dynamically changing subset of itineraries, wherein a display of a selected itinerary in the dynamically changing subset provides an indication of availability of the message, and wherein the indication of availability is based on at least one of the message category and the priority level.

17. The computer-readable memory of claim 16, wherein each of a plurality of predetermined message categories is associated with a different icon, and wherein the indication of the availability of the message comprises displaying, in the context of the respective itinerary, an icon associated with the message category of the received request.

* * * * *